United States Patent
Brugger et al.

(10) Patent No.: US 9,122,301 B2
(45) Date of Patent: Sep. 1, 2015

(54) STEERING AND BRAKE ARRANGEMENTS

(75) Inventors: Klaus Brugger, Marktoberdorf (DE); Christoph Wintergerst, Unterthingau (DE); Herbert Kerler, Oberostendorf (DE); Franz Erhard, Seeg (DE)

(73) Assignee: AGCO International GmbH, Neuhausen (CH)

( * ) Notice: Subject to any disclaimer, the term of this patent is extended or adjusted under 35 U.S.C. 154(b) by 0 days.

(21) Appl. No.: 14/123,240

(22) PCT Filed: May 21, 2012

(86) PCT No.: PCT/EP2012/059403
§ 371 (c)(1),
(2), (4) Date: Dec. 2, 2013

(87) PCT Pub. No.: WO2012/163718
PCT Pub. Date: Dec. 6, 2012

(65) Prior Publication Data
US 2014/0096635 A1   Apr. 10, 2014

(30) Foreign Application Priority Data
Jun. 3, 2011 (GB) .................................. 1109306.9

(51) Int. Cl.
*G05G 13/00* (2006.01)
*B60T 7/04* (2006.01)
*B60T 11/21* (2006.01)

(52) U.S. Cl.
CPC . *G05G 13/00* (2013.01); *B60T 7/04* (2013.01); *B60T 11/21* (2013.01); *Y10T 74/2022* (2015.01)

(58) Field of Classification Search
CPC ........ G05G 3/008; G05G 13/00; B60T 11/21; B60T 7/04; Y10T 74/2022
USPC ......................................................... 180/315
See application file for complete search history.

(56) References Cited

U.S. PATENT DOCUMENTS 4,669,564 A    6/1987 Kreutz
6,929,104 B2 *  8/2005 Thomas ........................ 188/345

FOREIGN PATENT DOCUMENTS

| EP | 0029757 A1 | 6/1981 |
| EP | 0720080 A1 | 7/1996 |
| GB | 1065316 A  | 4/1967 |
| GB | 2466066 A  | 6/2010 |
| JP | 60042146 A | 12/1985 |

* cited by examiner

*Primary Examiner* — Paul N Dickson
*Assistant Examiner* — Joselynn Y Sliteris

(57) ABSTRACT

A tractor steering and braking arrangement has a substantially vertically extending structural support column 11 for connection at a lower end 12 to a floor 13 of a tractor cab and carrying means 18 to support a steering wheel 15 at its upper end. At least one hydraulic master cylinder 29, 30 for operation of brakes of the tractor is supported within the column 11. The master cylinder 29, 30 includes an operating rod 27, 28 and an associated piston which is moved substantially vertically by an associated brake operating pedal 19, 20. The pedal is positioned at one side of the structural support column 11 and supported for pivoting from the column. Where separate left and right brakes are used, separate left and right master cylinders are mounted vertically within the support column 11. Both pedals are also mounted for pivoting from the column at a position 21 inside the column.

6 Claims, 8 Drawing Sheets

STEERING AND BRAKE ARRANGEMENTS

BACKGROUND OF THE INVENTION

1. Field of Invention

This invention relates to steering and brake arrangements for vehicles such as tractors which comprise a steering column support structure which carries a steering wheel of the vehicle and at least one brake pedal and associated hydraulic master cylinder for operating separate left and right brakes of the vehicle.

2. Description of Related Art

In modern tractors space is at a premium and there is therefore a requirement to provide a compact steering wheel and brake pedal support arrangement which can be located conveniently in the cab for the vehicle operator.

Known steering and brake arrangements often require a significant amount of room because the master cylinders are aligned with the plane of pivoting of the brake pedals and the associated master cylinders may be oriented horizontally and thus project forwardly of the vehicle taking up a significant amount of valuable space in the cab.

As the master cylinders and the means to bear the pivot movement of the pedals are positioned at one side of the steering column support structure, additional space is required on one side of the steering column support structure and the sideways offset result in a bending load of the steering column support structure which requires a strengthened structure.

Horizontal master cylinders often extend into the engine compartment under the motor bonnet which reduces space in the engine bay and prevent the use of front screens without cut-outs which are cheaper to produce than front screens with cut-outs. Screens without cut-outs may be used for vehicles where the cab is positioned at the front of the vehicle e.g. harvesters, application equipment or tool carrier tractors with no engine in front of the cab.

Also, as the driver must pass in between steering column and the seat to reach his driving position, the steering column should be ideally positioned as close as possible to the front of the cab to enable comfortable entry.

In addition, often the steering column and the respective cowlings are equipped with air outlets supplied by the heating, ventilating and air conditioning system of the cab. These outlets are supplied by a duct system close to the steering column. As the performance of these outlets depend on the air volume, the ducts should be as large as possible so the steering column and associated control pedal arrangement needs to be as compact as possible.

The use of a compact steering and brake arrangement is also important on tractors where the driving seat can rotate through 180 degrees to a reverse driving position in order to provide good clearance for the rotation of the seat.

Also modern tractors are equipped with motor bonnets which are very narrow immediately in front of the cab to improve the driver's view on the front wheels e.g. when driving along the furrow during ploughing. Again a compact steering and braking arrangement is important so as not to ways impede the driver's view in this area.

OVERVIEW OF THE INVENTION

It is an object of the present invention to provide a compact steering and brake arrangement which is suitable for tractor use.

Thus according to the present invention there is provided a tractor steering and braking arrangement comprising a substantially vertically extending structural support column for connection at a lower end to a floor of a tractor cab and carrying means to support a steering wheel at its upper end, at least one hydraulic master cylinder for operation of brakes of the tractor supported within the column, the master cylinder including an operating rod and an associated piston which is moved substantially vertically by an associated brake operating pedal, the pedal being positioned at one side of the structural support column and supported for pivoting from the column.

Such an arrangement is compact since the master cylinder extends substantially vertically within the support column and the pedal can be positioned conveniently for the operator to one side of the column at a location which is not too close to the operator.

Preferably, where a pair of separate left and right brake pedals are used to operate separate left and right master cylinders for operation of left and right brakes of the tractor, the master cylinders are both mounted vertically within the column.

Conveniently the arrangement can be made more compact if each pedal is mounted on the lower end of an arm whose upper end is cranked towards the column and is pivotally mounted on a substantially horizontal phi supported inside and from the column, respective actuating arms which extend substantially perpendicular to the pivot pin connecting each arm to its respective master cylinder operating rod.

As both master cylinder and means to bear the pivot movement of the pedal are positioned within the steering column support structure, the force application when actuating brake pedals is aligned inside the steering column support structure and thereby the bending load of the steering column support structure is massively reduced so the steering column support structure may require less reinforcement and space.

A latch may be provided to secure the brake pedal arms together when simultaneous operation of the brakes is required.

Conveniently sensing switches contact each pedal arm to provide an indication of the operation of each brake pedal.

BRIEF DESCRIPTION OF THE DRAWINGS

One embodiment of the present invention will now be described, by way of example only with reference to the accompanying drawings in which.

DETAILED DESCRIPTION OF THE INVENTION

Figure 1:
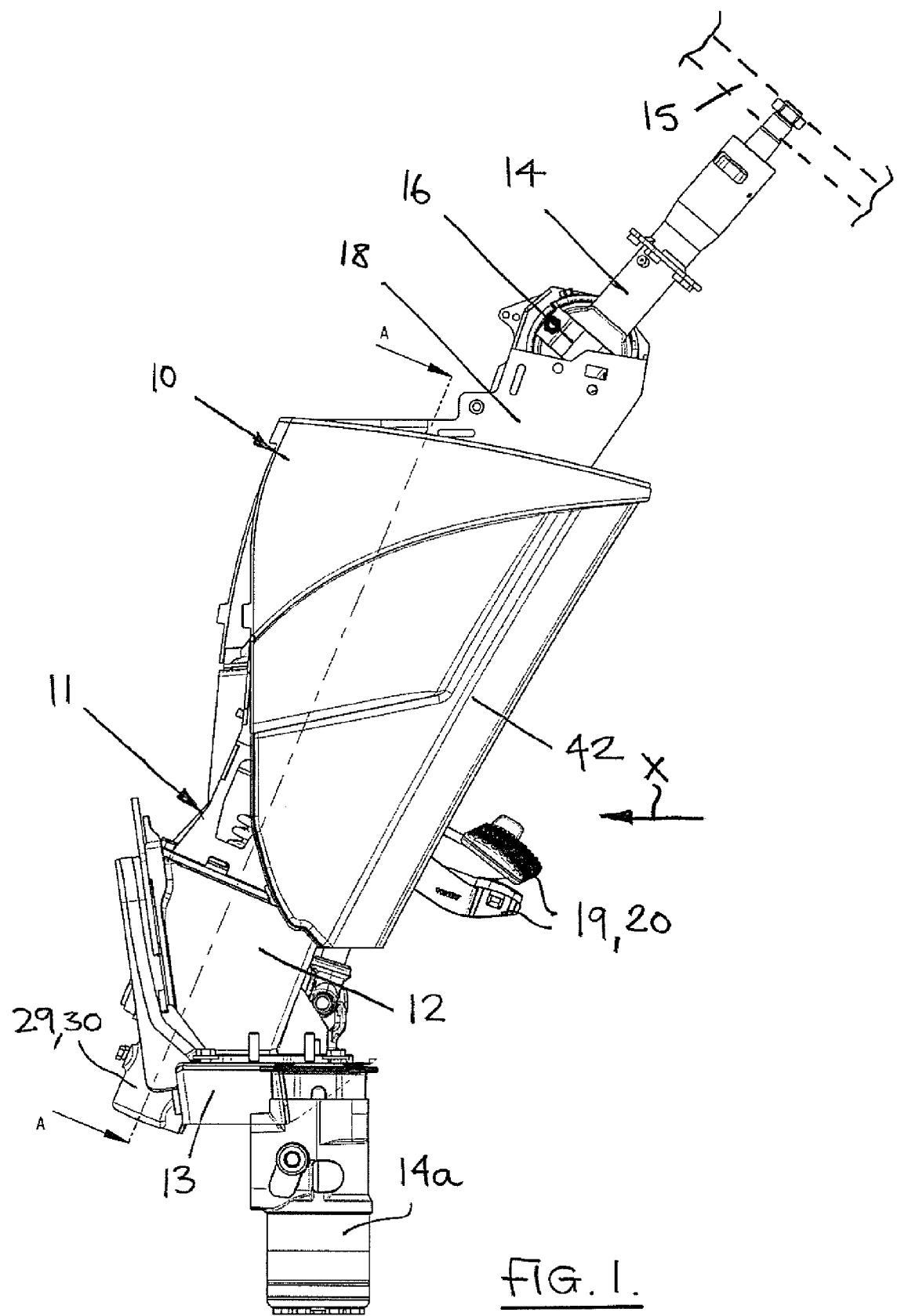
FIG. 1 shows a side view of a steering and brake arrangement in accordance with the present invention.

Referring to the drawings, a steering and brake arrangement 10 comprises a substantially vertically extending structural support column 11 for connection at a lower end 12 to a cab floor 13. The support column 11 mounts a steering column 14 which carries at its upper end a steering wheel indicated diagrammatically at 15. The steering column has a pivotal connection 16 which allows the angle of inclination of the steering wheel 15 to be adjusted in the known manner. The steering column 14 is connected to the steering valve unit 14a which supplies oil to the steering cylinder of a steerable axle. Steering valve unit 14a is positioned under cab floor 13 to reduce noise impact on the cab interior.

The structural support column 11 comprises a lower part 12, a central portion 17 and an upper portion 18 which supports the pivotal connection 16.

Figure 2:
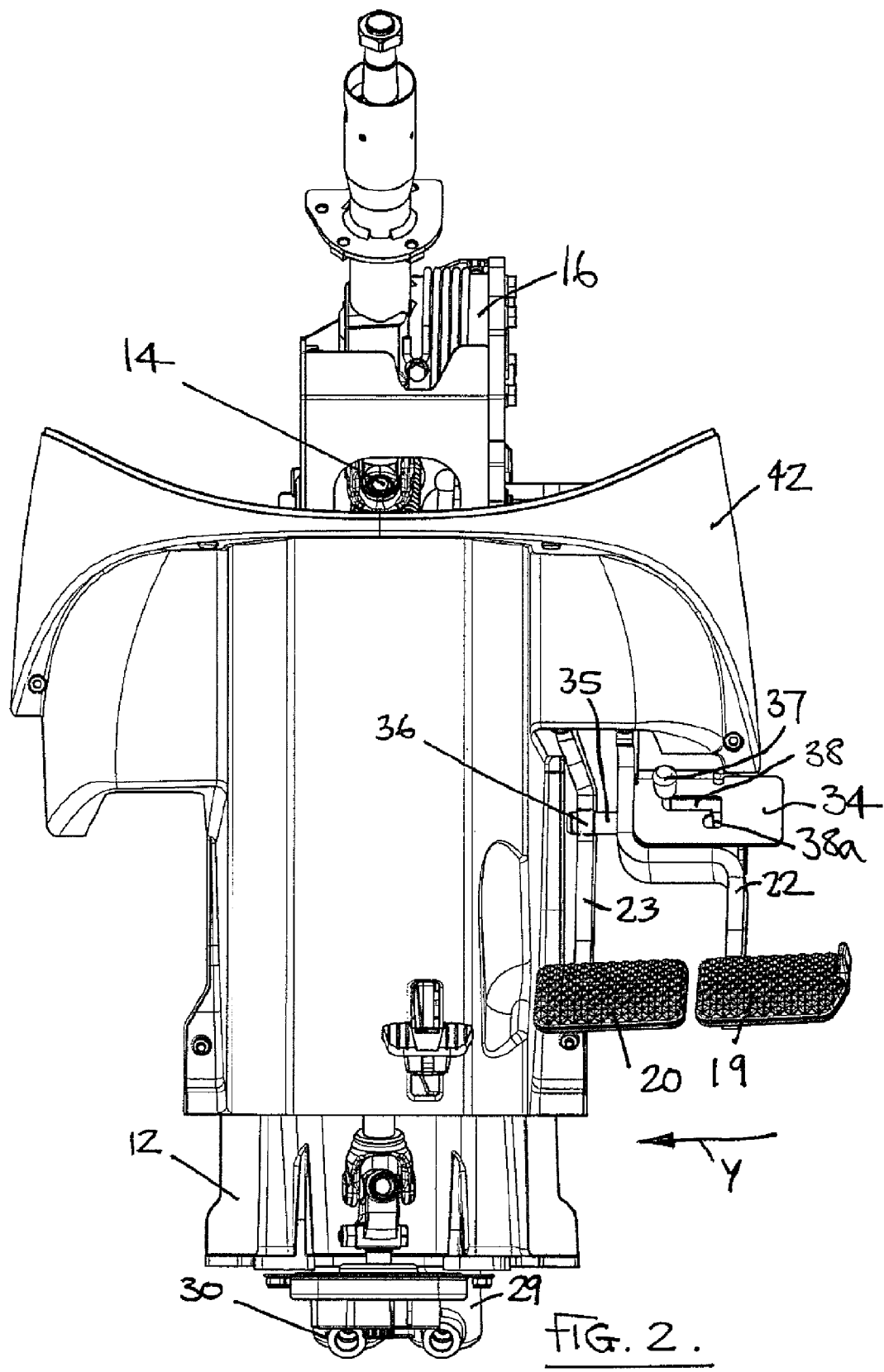
FIG. 2 shows a view in the direction of the arrow X of FIG. 1.

In accordance with the present invention, a pair of brake pedals 19 and 20 are mounted on the side of the support column 11 and are positioned to the right of this column as viewed from the tractor driver's seat as shown in FIG. 2.

Figure 5:
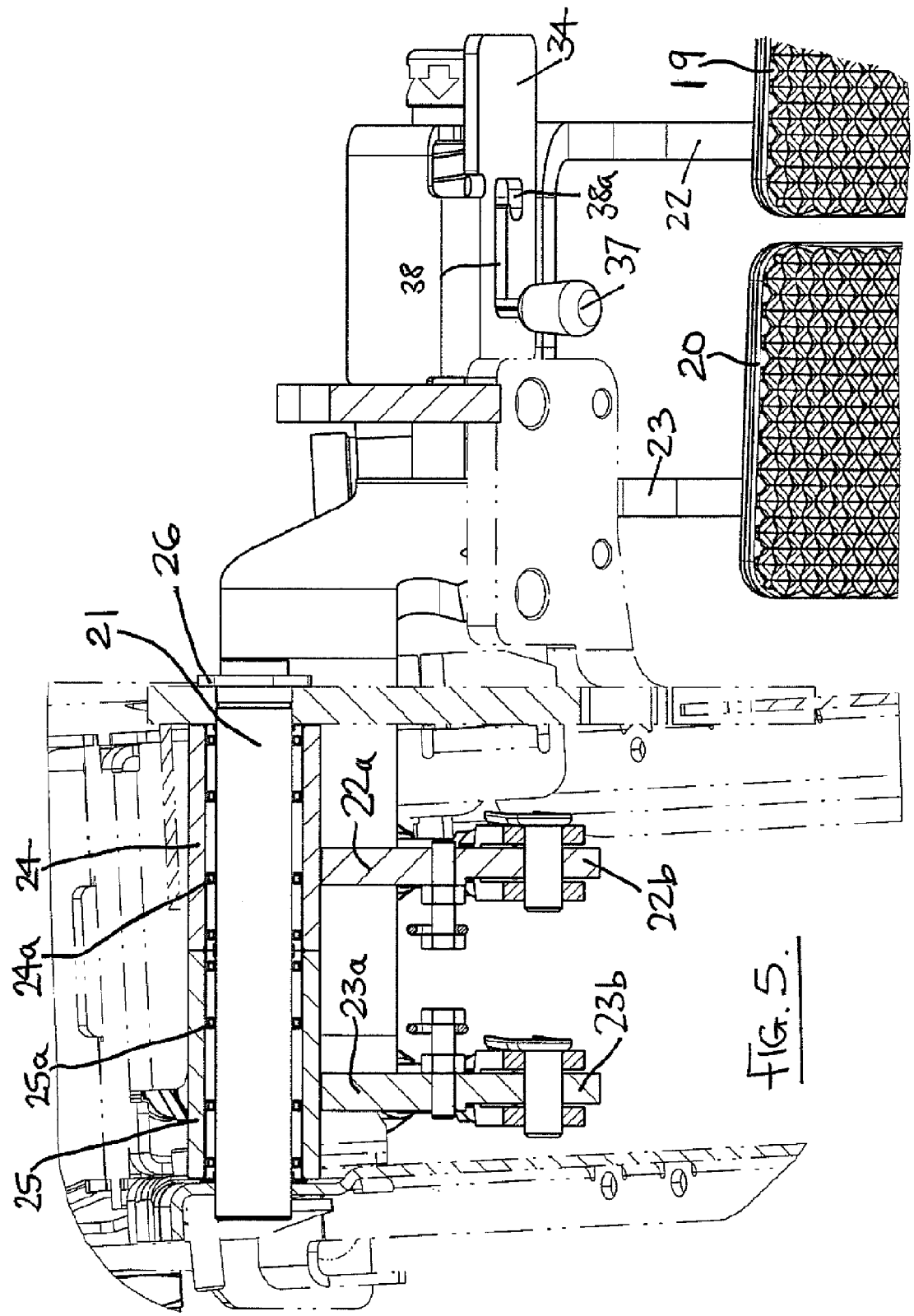
FIG. 5 shows a section on the line B-B of FIG. 4.
Figure 6:
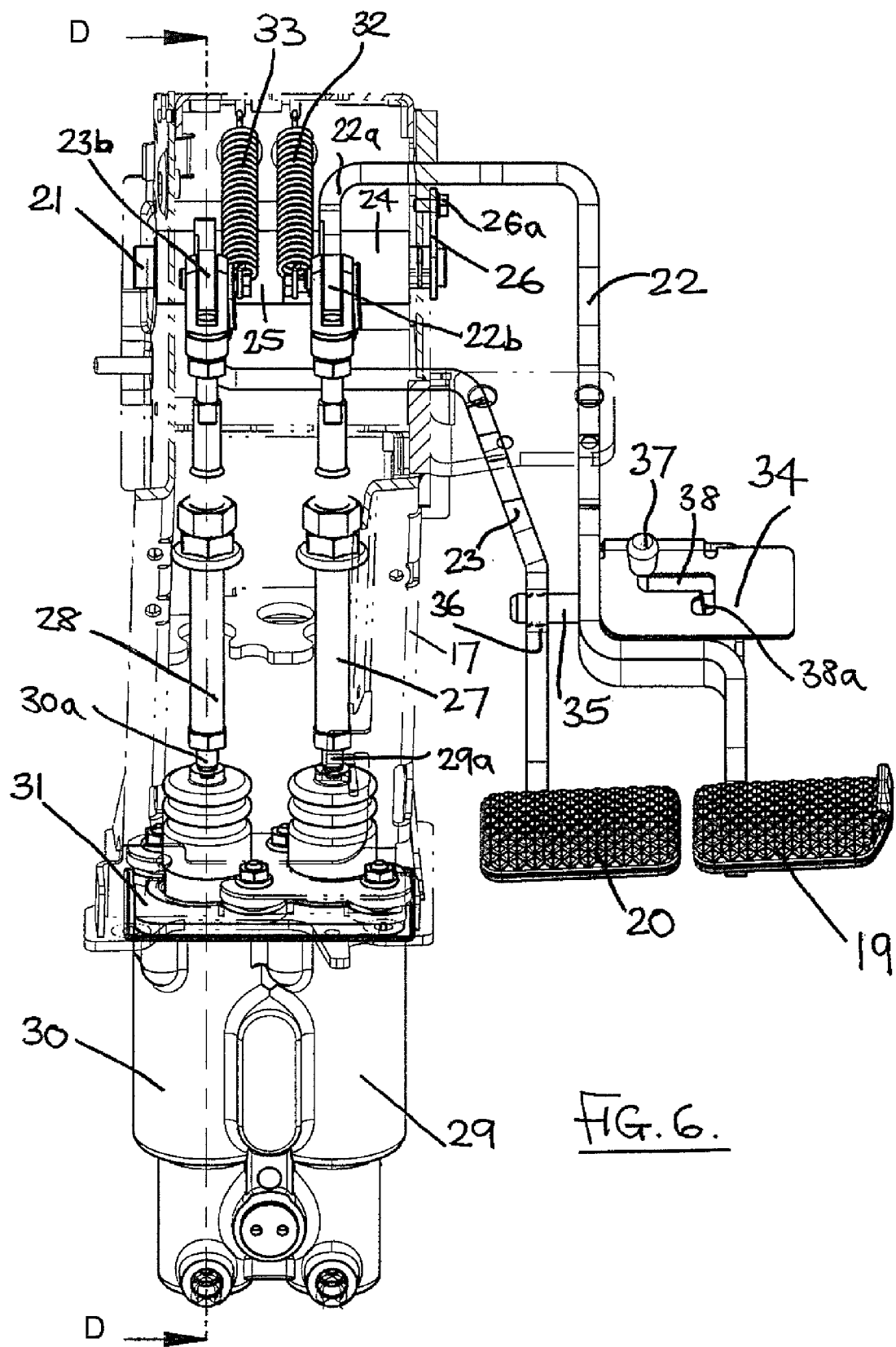
FIG. 6 shows a section on line C-C of FIG. 4.
Figure 7:
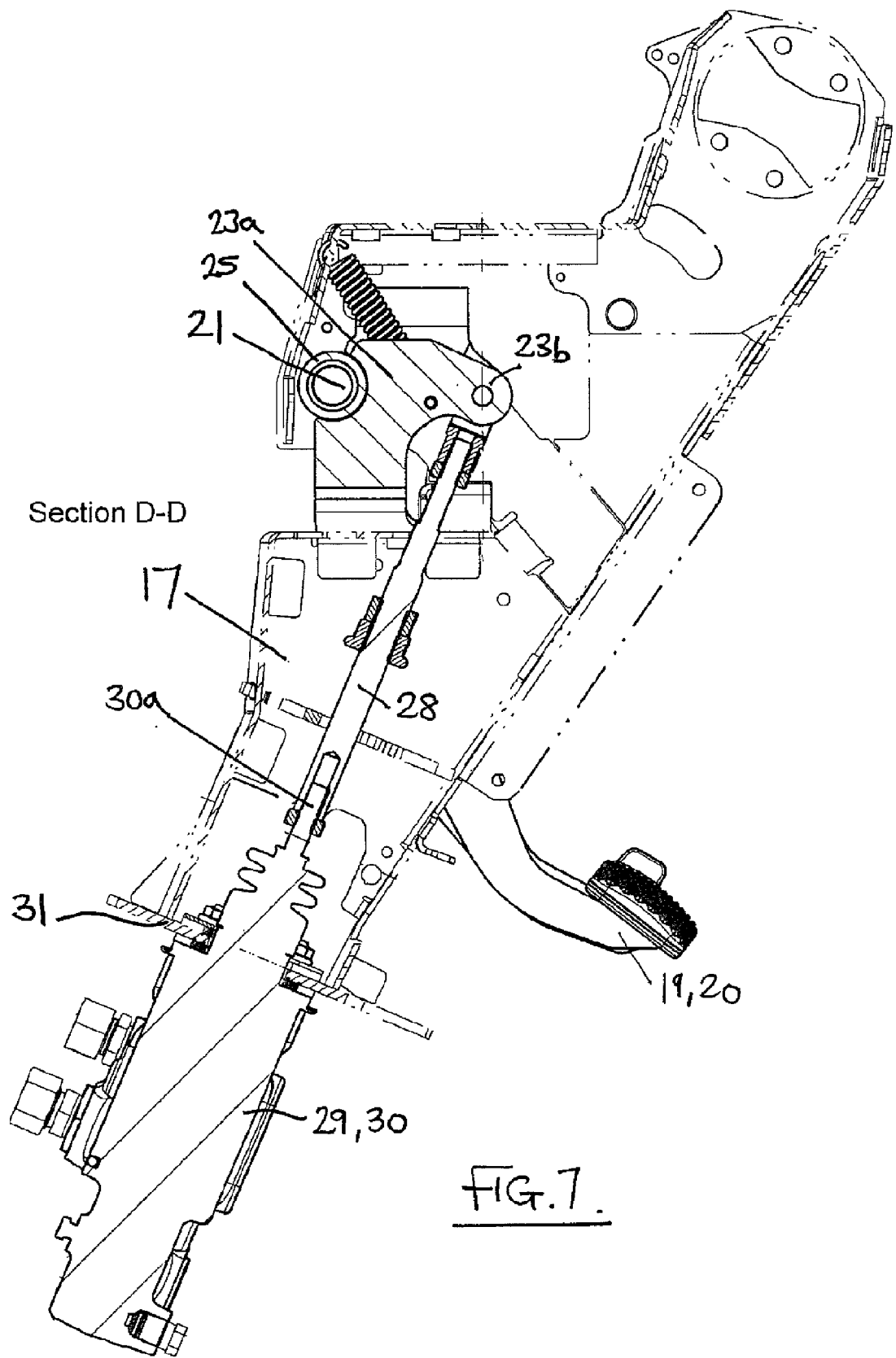
FIG. 7 shows a section on the line D-D of FIG. 6.
Figure 8:
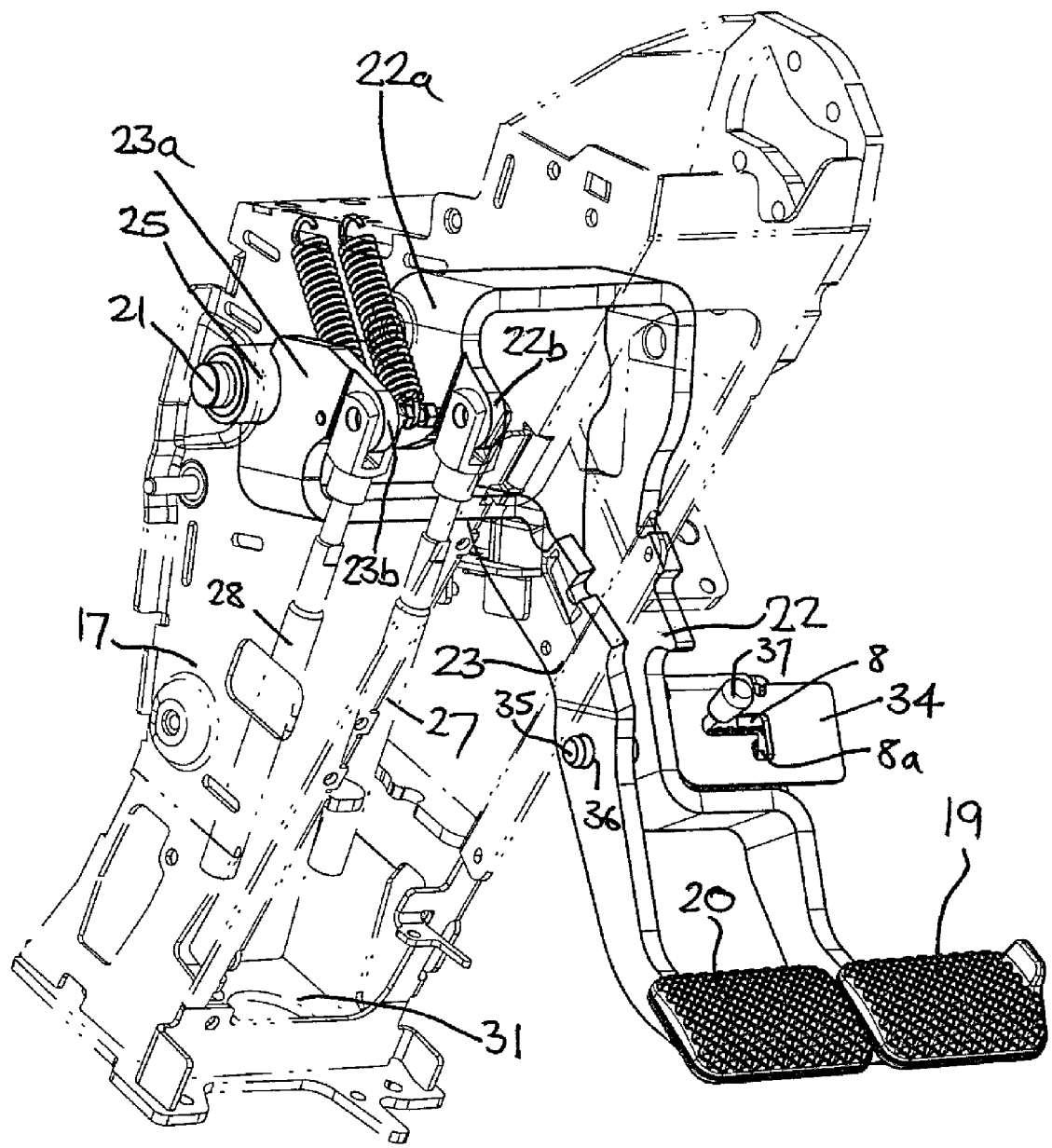
FIG. 8 shows a perspective view of part of the steering and brake arrangement of the present invention.

These brake pedals are pivotally mounted on and within the support column 11 via a pivot pin 21 best seen in FIGS. 5, 7 and 8. Each pedal 19 and 20 is mounted on the lower end of an associated pedal arm 22 and 23 which is of a cranked shape having an upper end 22a and 23a respectively which is significantly offset to the left as viewed in FIGS. 5, 6 and 8 with each upper end 22a and 23a being mounted on a respective pivot sleeve 24 and 25 which encircles pivot pin 21 and is mounted thereon via bearings 24a and 25a respectively. Pivot pin 21 is provide with an attachment plate 26 which allows the pin to be secured to the support column 11 by a bolt 26a to prevent movement of the pin relative to the column when the brake pedals 19 and 20 are in use.

The upper portion 22a and 23a of each brake pedal arm has an actuating arm 22b and 23b respectively which extends perpendicularly to the respective pivot sleeves 24 and 25. Attached to each respective actuating arm 22b and 23b is a push rod 27,28 which in turn is connected to a separate hydraulic brake actuating master cylinder 29 and 30 for operation of the right and left rear wheel brakes of the associated tractor. These master cylinders are combined into a single casting (but could be completely separate units) and are bolted to a bulk head 31 which constitutes the lower end of the central portion 17 of the support column 11. The master cylinders 29 and 30 project within the lower end 12 of the support column 11 which is secured to the cab floor 13, as best seen in FIG. 1. Each master cylinder has an internal piston (not shown) which is moved substantially vertically by an associated operating rod 29a, 30a.

The upper end of each brake pedal arm 22, 23 has a respective return spring 32, 33 connected thereto. The other end of each spring is connected to the support column 11.

Thus if, for example, the right hand brake pedal is pressed this pivots pedal arm 22 about pin 21 which in turn pushes down the associated push rod 27 via actuating arm 22b to move the operating rod 29a, which in turn displaces the piston within the associated master cylinder 29 to apply the right wheel rear brake of the tractor. Similarly if the left hand brake pedal is depressed this pivots the associated arm 23 about pin 21 which in turn moves push rod 28 and associated master cylinder operating rod 30a via actuating arm 23a to move the operating piston within the left hand brake master cylinder 30 to apply the left rear wheel brake of the tractor.

As is conventional in tractors, in order for the tractor to be driven safely on the road, the two brake pedals 19 and 20 can be locked together by a locking mechanism 34 which comprises a spring loaded bolt 35 carried by pedal arm 22 which, when in the position shown in FIG. 6, engages an aperture 36 provided in brake pedal arm 23. To disengage bolt 35 from aperture 36, to allow independent operation of pedals 9 and 20, a peg 37 connected with bolt 35 is displaced to the right as viewed in FIG. 6 to compress spring 38 which biases bolt 35 to the left as viewed in FIG. 6. Peg 37 is moved along slot 38 in to portion 38a of slot 38 where the associated bolt 35 is retained in its retracted position out of engagement with aperture 36.

Brake operation sensors 40 and 41 act on the arms 22 and 23 of pedals 19 and 20 to provide signals indicative of the operation of the right and left brakes of the tractor. These signals are used by various control systems of the tractor and can also be used to activate the brake lights of the tractor.

Figure 3:
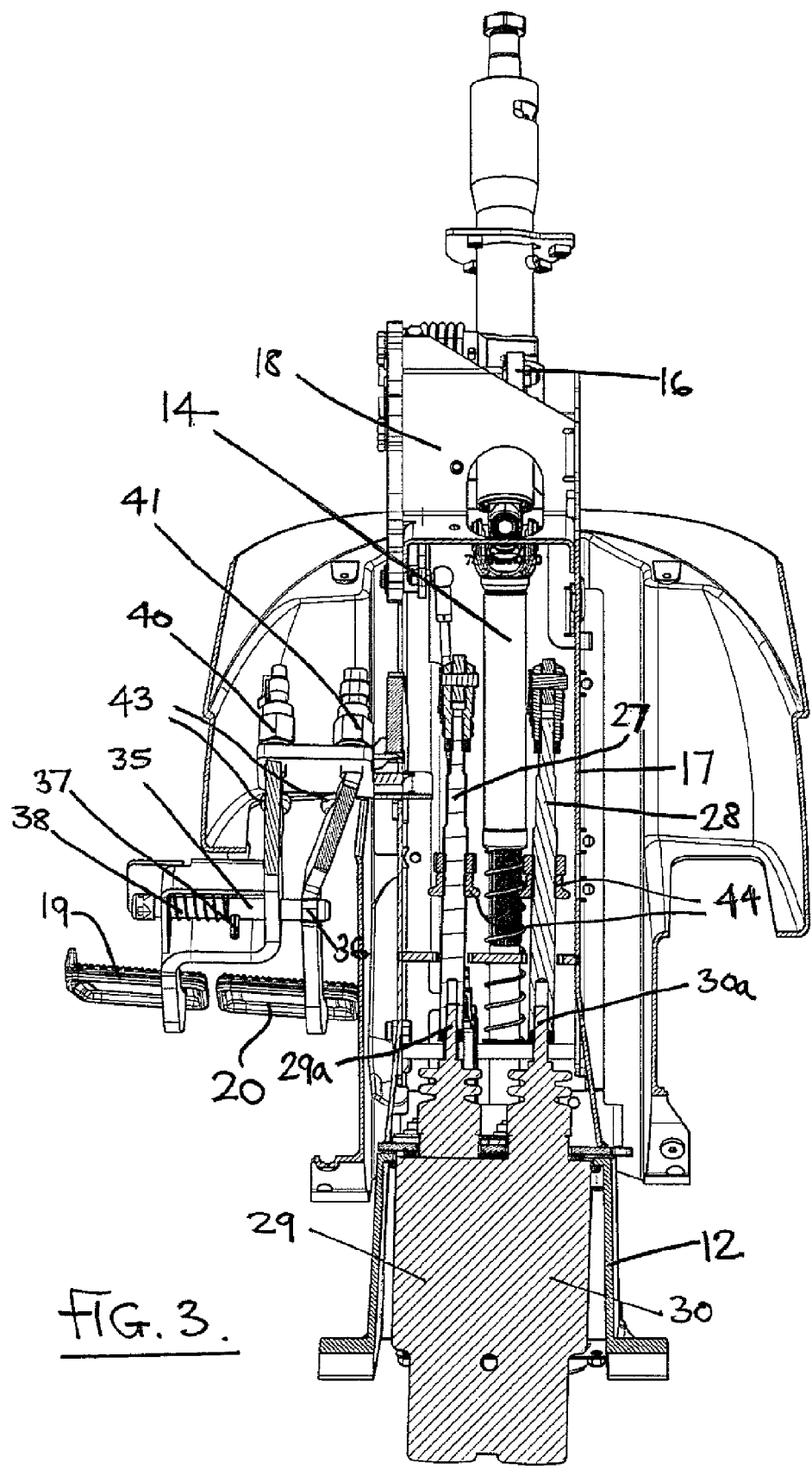
FIG. 3 shows a section on the line A-A of FIG. 1.
Figure 4:
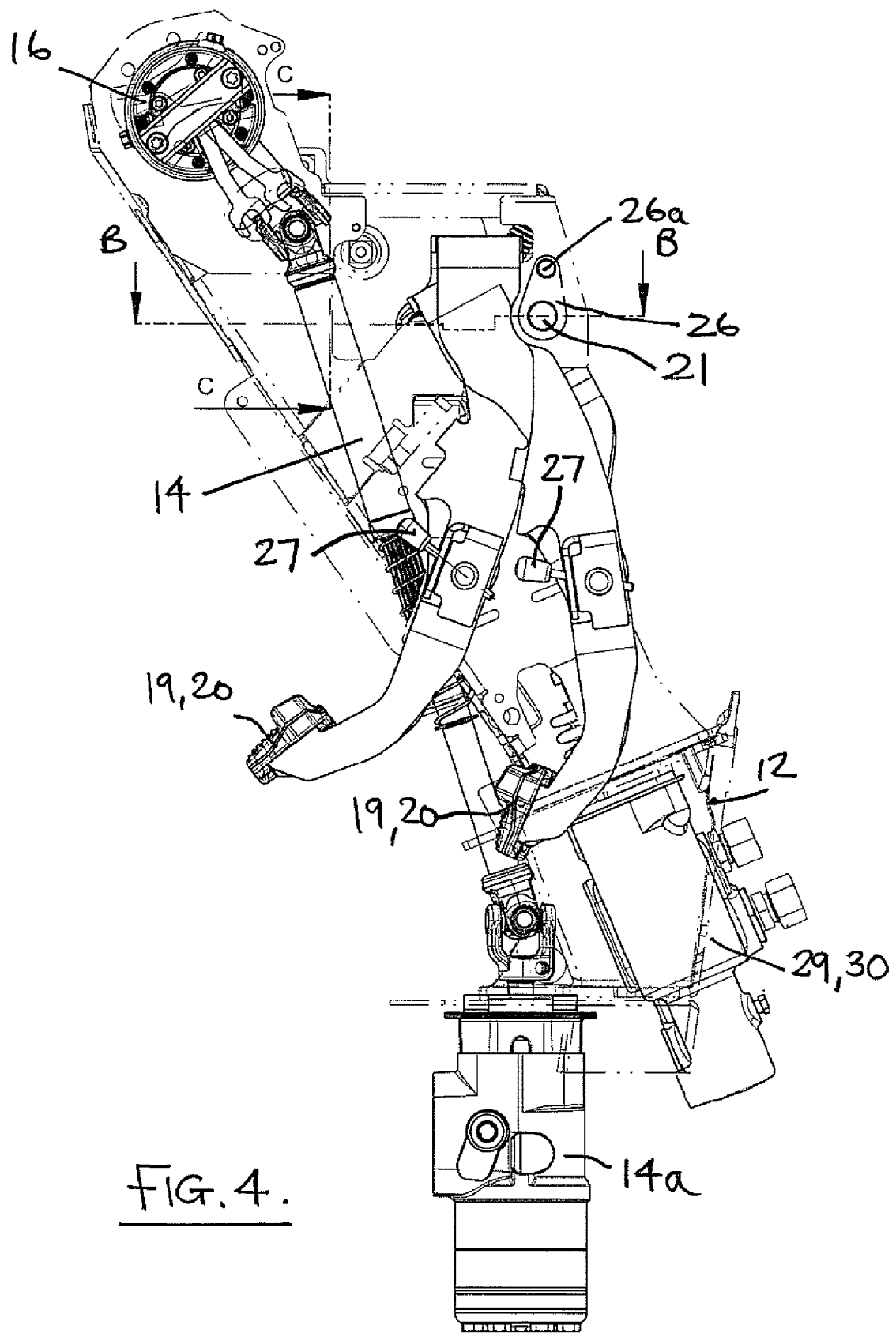
FIG. 4 shows a view in the direction of arrow Y of FIG. 2 with part of the structure removed for clarity and one of the pedals depressed.

As best seen in FIG. 3, first stops 43 limit the upwards movement of the pedal arms 22, 23 supported by return spring 32,33 and second stops 44 mounted on push rods 27,28 limit the downwards movement of pedal arms 22, 23 when operated by drivers foot. Both stops 43, 44 can be adjusted in well known manner by threatened nuts and a counter nut to block the adjustment.

As will be appreciated the structural support column 11 and the associated steering column etc is covered by an outer protective cowling, part of which is shown at 42 in the accompanying drawings, this cowling extends upwardly to cover the entire steering column 14 and the pivotal connection 16 and at its upper end includes the customary instrument panel display etc.

The above steering and braking arrangement is thus extremely compact since the master cylinder for the operation of the tractor brakes and the pivot pin for the brake pedals are mounted within the support column 11 and being disposed substantially vertically occupy relatively little space. Also, by mounting the pedals to one side of the support column 11 the pedals can be located at a convenient distance from the tractor operator without taking up excessive room in the cab. In addition the compact design allows the brake pedals to be positioned as close as possible near the column which improves ergonomics.

In the shown embodiment, two pedals and two respective master cylinders are described as the system provides steering brake function. It is envisaged that the system may also contain only one pedal and respective master cylinder when a steering brake function is not provided or is provided without two pedals.

In the shown embodiment, master cylinders 28, 29 and pin 21 are positioned within the structural support column 11. Alternatively, pin 21 may be positioned sideways of structural support column 11 with master cylinders 28, 29 positioned within. This may result in that the associated pedal arms 22, 23 may be of nearly straight shape as the pedals 19, 20 can be aligned with their respective pivot sleeves 24, 25. On the other hand actuating arms 22b, 23b may be of cranked shape to overcome offset to the master cylinders 28, 29. Still, as master cylinders 28, 29 are positioned within structural support column 11, design is still compact.

In the shown embodiment, the structural support column 11 is made of two parts for assembly reasons but it may be made in one-piece or of more than two pieces.

In the shown embodiment, master cylinders 29, 30 partly extend below the level of the cab floor 13. Especially for use with reversible drive arrangements, master cylinders 29, 30 may be moved upwards by raising bulk head 31 and thereby positioned above cab floor level.

In the shown embodiment, especially described in FIG. 3, brake operation sensors 40, 41 and first stops 43 are positioned outside the structural support column 11 while second stops 44 are positioned within the support column. Alternatively, first stops 43 may be positioned on the push rods 27, 28 similar to second stops 44. Furthermore, brake operation sensors 40, 41 may be positioned within the structural support column 11 detecting movement of push rods 27, 28.

Furthermore, return springs 32,33 may be installed coaxially to push rods 27,28 and acted by tappets integrated in first stops 43 or second stops 44.

Moreover, locking mechanism 34 as described in FIG. 3 may also be positioned inside the structural support column 11, especially if the locking mechanism 34, is actuated remotely by a hydraulic cylinder without the driver needing access. E.g. bolt 34 may be driven by an actuating cylinder attached to actuating arm 23a and may engage an additional bore in actuating arm 22a for locking pedals 19,20 together. This would make the design even more compact.

The invention claimed is:

1. A tractor steering and braking arrangement comprising a substantially vertically-extending, elongated structural support column for connection at a lower end to a floor of a tractor cab and carrying an upper portion arranged to support a steering wheel at an upper end of said support column, at least one hydraulic master cylinder supported within the column for operation of brakes of a tractor, the master cylinder including an operating rod and an associated piston which are moved substantially vertically by an associated brake operating pedal such that said operating rod and associated piston move in a direction along an elongated length of the structural support column, the pedal being positioned at one side of the structural support column and supported for pivoting from the column.

2. An arrangement according to claim 1 in which a pair of separate left and right brake pedals are provided at said one side of the structural support column to operate separate left and right master cylinders for operation of left and right brakes of the tractor, the master cylinders both being mounted substantially vertically within the column.

3. An arrangement according to claim 2 in which one or each pedal is supported for pivoting from the column at a position inside the column.

4. An arrangement according to claim 2 in which each pedal is mounted on a lower end of a brake pedal arm whose upper end is cranked towards the column and is pivotally mounted on a substantially horizontal pivot pin supported from the column, respective upper ends of the brake pedal arms extend substantially perpendicular to the pivot pin and connect each arm to a respective master cylinder operating rod.

5. An arrangement according to claim 4 in which a locking mechanism is provided to secure the brake pedal arms together when simultaneous operation of the brakes is required.

6. An arrangement according to claim 4 in which sensing switches contact one or each brake pedal arm to provide an indication of the operation of one or each brake pedal.

* * * * *